United States Patent
Park et al.

(10) Patent No.: US 9,573,794 B2
(45) Date of Patent: Feb. 21, 2017

(54) DRIVE SYSTEM FOR PASSENGER CONVEYOR

(75) Inventors: Chan-Jong Park, Vienna (AT); Alexander Turek, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 14/409,269

(22) PCT Filed: Jul. 10, 2012

(86) PCT No.: PCT/US2012/046051
§ 371 (c)(1),
(2), (4) Date: Sep. 2, 2015

(87) PCT Pub. No.: WO2014/011157
PCT Pub. Date: Jan. 16, 2014

(65) Prior Publication Data
US 2015/0375968 A1  Dec. 31, 2015

(51) Int. Cl.
*B66B 23/02* (2006.01)
*B66B 23/00* (2006.01)
*B66B 23/16* (2006.01)
*B65G 23/16* (2006.01)

(52) U.S. Cl.
CPC .............. *B66B 23/028* (2013.01); *B65G 23/16* (2013.01)

(58) Field of Classification Search
None
See application file for complete search history.

(56) References Cited

U.S. PATENT DOCUMENTS

| 4,535,880 | A | * | 8/1985 | Boltrek ................... B66B 23/02 198/330 |
| 5,103,968 | A | | 4/1992 | Skarlupka |
| 2002/0179405 | A1 | | 12/2002 | Ostermeier et al. |
| 2005/0061609 | A1 | | 3/2005 | Pietz |
| 2008/0053788 | A1 | | 3/2008 | Ishikawa et al. |
| 2009/0139830 | A1 | | 6/2009 | Gonzalez Alemany et al. |

FOREIGN PATENT DOCUMENTS

| CN | 1337917 A | 2/2002 |
| CN | 1628062 A | 6/2005 |
| CN | 101456516 A | 6/2009 |
| DE | 1026222 B | 3/1958 |
| FR | 1469624 A | 2/1967 |
| JP | 2003-192263 A | 7/2003 |
| WO | WO 2014-011157 A1 | 1/2014 |

OTHER PUBLICATIONS

International Search Report and Written Opinion for related International Application No. PCT/US13/23599; report dated Apr. 15, 2013.
Chinese Office Action and Search report for application CN201280074667.5, dated Jul. 27, 2015, 8 pages.
European Search Report for application EP12881133.8, Feb. 8, 2016, 6 pages.

* cited by examiner

*Primary Examiner* — Kavel Singh
(74) *Attorney, Agent, or Firm* — Cantor Colburn LLP

(57) ABSTRACT

A drive chain band for a chain drive device having chain links and pins is provided. The drive chain band may include one or more drive bands, and a plurality of connectors disposed on the one or more drive bands. Each connector may have a toothed profile configured to directly receive and engage the pins.

19 Claims, 9 Drawing Sheets

DRIVE SYSTEM FOR PASSENGER CONVEYOR

CROSS-REFERENCE TO RELATED APPLICATIONS

This Application is a US National Stage under 35 USC §371 of International Patent Application No. PCT/US12/46051 filed on Jul. 10, 2012.

BACKGROUND

Technical Field

The present disclosure is directed to chain driven devices, and more particularly to systems and assemblies for driving passenger conveyors.

Description of the Related Art

Conveyor systems, such as moving walkways and escalators, are typically used to help passengers conveniently move from one location to another. The stairways or walkways of passenger conveyors essentially include an interconnected band of pallets, respectively, which are propagated between two landings. The construction of moving walkways for instance typically includes one of two basic styles, either pallet type or moving belt type. A belt type moving walkway typically includes a mesh metal or rubber belt disposed over a series of rollers. A pallet type moving walkway typically includes a continuous series of pallets joined together to form a walkway.

Pallet-type moving walkways generally include a truss assembly which houses a drive mechanism that drives the pallets. Specifically, the pallets are connected to a driving chain that includes a plurality of interconnected rollers. The driving chain is engaged with a drive track and is operatively connected to the drive mechanism, such as one or more drive sprockets. As the drive mechanism drives the driving chain, the pallets move along the drive track from a passenger carrying portion to a return portion, which is typically located underneath the passenger carrying portion. The walkway assembly including the truss assembly, drive mechanism and the return portion is typically located in a pit constructed for that purpose.

In moving walkways employing pit configurations, the height difference between the surrounding floor level and the passenger carrying surface of the pallets, or the pallet height, may sometimes require relatively steep and/or lengthy ramps at the ends of the moving walkway for the purposes of passenger comfort and handicapped access. In addition, parallel moving walkways, operating in opposite directions, would require two pits, two drive mechanisms and two pallet bands, thereby further adding to the overall expense and space requirements of installation. While such concerns have introduced variations of linear drive mechanisms which offer more compact conveyor designs, there is still much room for improvement.

To provide a more compact design, some linear drive systems employ less components and/or smaller components to perform the same tasks required by conventional drive systems. However, this results in a greater magnitude of forces or loads that are exerted on the relatively weaker components, thus increasing wear and reducing sustainability. In other existing linear drive systems, each pallet is directly connected to a set of toothed drive belts or chains which extend the length of several pallets. The flexibility of the lengthy belts or chains, however, results in significant vibrations, which can further lead to increased noise and overall wear on the conveyor.

Still, in other linear drive systems, the drive chains are used to directly engage the pallet rollers. In such configurations, however, the engagement between the drive chain and each pallet roller generates a bending moment on each passing roller. The bending moment not only causes an increase in the wear on the pallet rollers as well as the drive chains, but also reduces the overall efficiency of energy transfer between the drive chains and the pallet rollers. Furthermore, as the drive chains directly engage the pallet rollers, reductions in the pitch length of the drive chains, and thus reductions in the overall height of the conveyor system, are constrained by the size of the pallet rollers.

Thus, there is a need for a more compact drive system that can provide for an overall shallower passenger conveyor design and realize pit-free conveyor implementations. Moreover, there is a need for a moving walkway with reduced passenger carrying surface height relative to the surrounding floor surface for improved passenger comfort, easier handicapped access, as well as better aesthetics of the landing design. There is also a need for a more reliable drive system which operates with less noise and less vibrations. In particular, there is a need for a drive system which transfers the rotational torque, or the force generated by a drive machine, into translational movement of the pallets with more efficiency, while reducing the wear on the individual components thereof.

SUMMARY OF THE DISCLOSURE

According to one aspect of the present disclosure, a drive chain band for a chain drive device having chain links and pins is provided. The drive chain band may include one or more drive bands, and a plurality of connectors disposed on the one or more drive bands. Each connector may include a toothed profile configured to directly receive and engage the pins.

In a refinement, the drive chain band may further include chain rollers and the pins may be axially coupled to at least one of the chain rollers and chain links.

In another refinement, the one or more drive bands may include a first drive band and a second drive band, and the connectors may comprise intermediate connectors between the first and second drive bands. Each intermediate connector may have a first toothed profile coupled to the first drive band and a second toothed profile coupled to the second drive band.

In a related refinement, the first and second drive bands may be of equal lengths and have an equal number of drive chain links. The first and second drive bands may be oriented such that each drive chain link of the first drive band is in direct rotational alignment with the corresponding drive chain link of the second drive band. Each intermediate connector may be disposed between a corresponding pair of drive chain links.

In yet another related refinement, adjacent drive chain links in each of the first and second drive bands may be pivotally joined by drive chain link pins having drive chain rollers coaxially disposed thereabout. The intermediate connectors may be configured to engage the pins such that the center axis of each engaged pin remains substantially aligned with the drive chain link pins and the drive chain rollers, and the direction of force applied onto the pins is in substantial alignment with the direction of travel of the drive chain link pins.

In another refinement, each connector may include a recessed midsection configured to provide sufficient clearance for the chain rollers and the chain links traveling therethrough.

In another refinement, each toothed profile of the connectors may include one of a single-tooth profile, a duplex-tooth profile and a multi-tooth profile.

In another refinement, at least one toothed profile may be disposed at an exterior side of the drive bands and configured to engagably receive any pins outer-axially positioned relative to the drive bands.

In another refinement, the connectors may be coupled to the chain links by one or more of screwing, snapping and pressing thereon.

In yet another refinement, the drive bands may be comprised of one of roller chains, toothed belts and inverted tooth chains.

According to yet another aspect of the present disclosure, a drive assembly for a chain drive device having pallet chain links, pallet chain rollers and extension pins is provided. The drive assembly may include a drive chain band having a first drive band and a second drive band, a plurality of intermediate connectors disposed between the first and second drive bands, and at least one sprocket wheel having a first sprocket and a second sprocket. Each intermediate connector may have a first toothed profile coupled to the first drive band and a second toothed profile coupled to the second drive band. The first and second toothed profiles may be configured to receive the extension pins. The first sprocket may be configured to engage the first drive band, and the second sprocket may be configured to engage the second drive band.

In a refinement, the drive assembly may further include pallet connectors directly coupled to the pallet chain links.

In another refinement, the extension pins may be axially coupled directly to the pallets.

In another refinement, the first and second drive bands may be of equal lengths and have an equal number of drive chain links. The first and second drive bands may be oriented such that each drive chain link of the first drive band is in direct rotational alignment with the corresponding drive chain link of the second drive band. The first and second sprockets may be oriented such that each sprocket tooth of the first sprocket is in direct rotational alignment with a corresponding sprocket tooth of the second sprocket.

In a related refinement, adjacent intermediate connectors may be distanced according to the pitch of an associated pallet chain band and not all extension pins may be seated within an intermediate connector.

In another related refinement, not all toothed profiles of the intermediate connectors may engage an extension pin.

In yet another related refinement, adjacent drive chain links in each of the first and second drive bands may be pivotally joined by drive chain link pins having drive chain rollers coaxially disposed thereabout. The intermediate connectors may be configured to engage the extension pins such that the center axis of each engaged extension pin remains substantially aligned with the drive chain link pins and the drive chain rollers, and the direction of force applied onto the extension pins is in substantial radial alignment with the direction of travel of the drive chain link pins.

In another refinement, at least one toothed profile may be disposed at an exterior side of the first and second drive bands and configured to engagably receive any pins outer-axially positioned relative to the first and second drive bands.

In another refinement, the sprocket wheel may include a leading wheel having a first leading sprocket and a second leading sprocket, and a trailing wheel having a first trailing sprocket and a second trailing sprocket. The first drive band may be engaged about the first leading sprocket and the first trailing sprocket. The second drive band may be engaged about the second leading sprocket and the second trailing sprocket.

In a related refinement, the drive assembly may further include drive chain guides disposed between the leading and trailing sprocket wheels and configured to guide travel of each of the first and second drive bands thereacross. Each drive chain guide may be disposed in substantial alignment with each of the first and second corresponding sprocket wheels and the first and second corresponding drive bands associated therewith.

In another related refinement, at least one of the leading and trailing wheels may be biased by a tensioning mechanism in a direction configured to maintain tension in the drive chain band between the leading and trailing wheels.

In another related refinement, the drive assembly may further include at least one drive sprocket coaxially coupled to the leading wheel. The drive sprocket may be configured to receive a rotational torque from a drive machine.

In yet another related refinement, a drive shaft may be axially disposed between the leading wheel and a second leading wheel of a second drive system. The drive sprocket may be configured to receive a rotational torque from a drive machine in the drive shaft.

In yet another refinement, the drive assembly may be configured for a passenger conveyor.

Other advantages and features of the disclosed apparatus and method will be described in greater detail below. It will also be noted here and elsewhere that the apparatus or method disclosed herein may be suitably modified to be used in a wide variety of applications by one of ordinary skill in the art without undue experimentation.

BRIEF DESCRIPTION OF THE DRAWINGS

For a more complete understanding of the disclosed apparatus, assemblies and systems, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed device or method which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
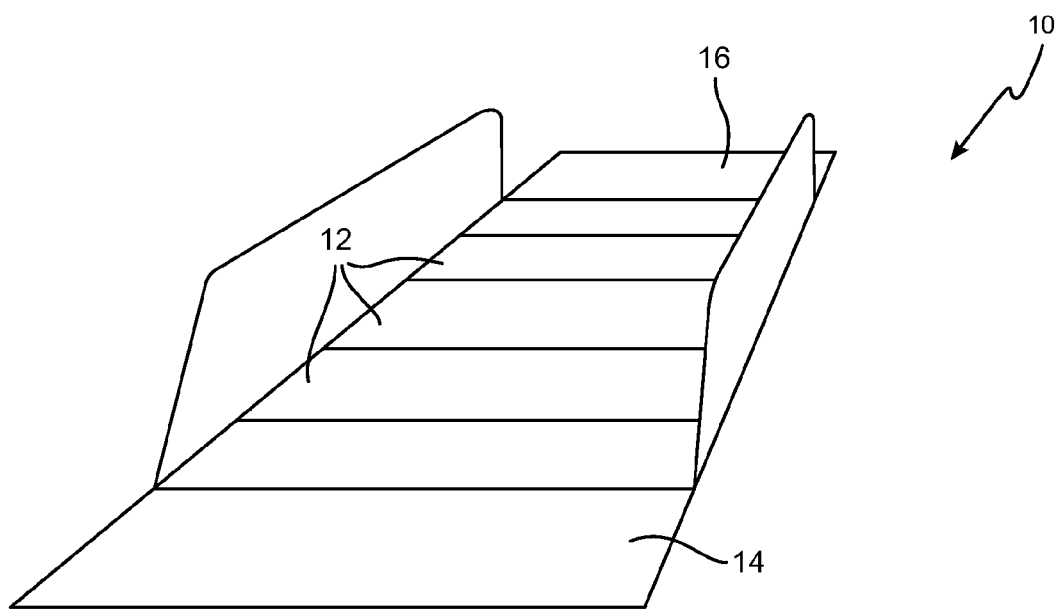
FIG. 1 illustrates a perspective view of one conveyor with a plurality of movable pallets that may be driven at least partially based on the teachings of the present disclosure.

Referring now to FIG. 1, an exemplary chain drive device 10, such as a moving walkway or any other suitable passenger conveyor, for example, is illustrated as generally including a plurality of pallets 12 that are movable between a first landing 14 and a second landing 16. The pallets 12 may be joined to one another to form a continuous band of pallets 12 which rotate within the conveyor 10. During operation, for example, the exposed, upper run of pallets 12 may travel from the first landing 14 and toward the second landing 16, while the lower run of pallets 12 may travel from the second landing 16 and toward the first landing 14 along a return path underneath the conveyor 10.

Figure 2:
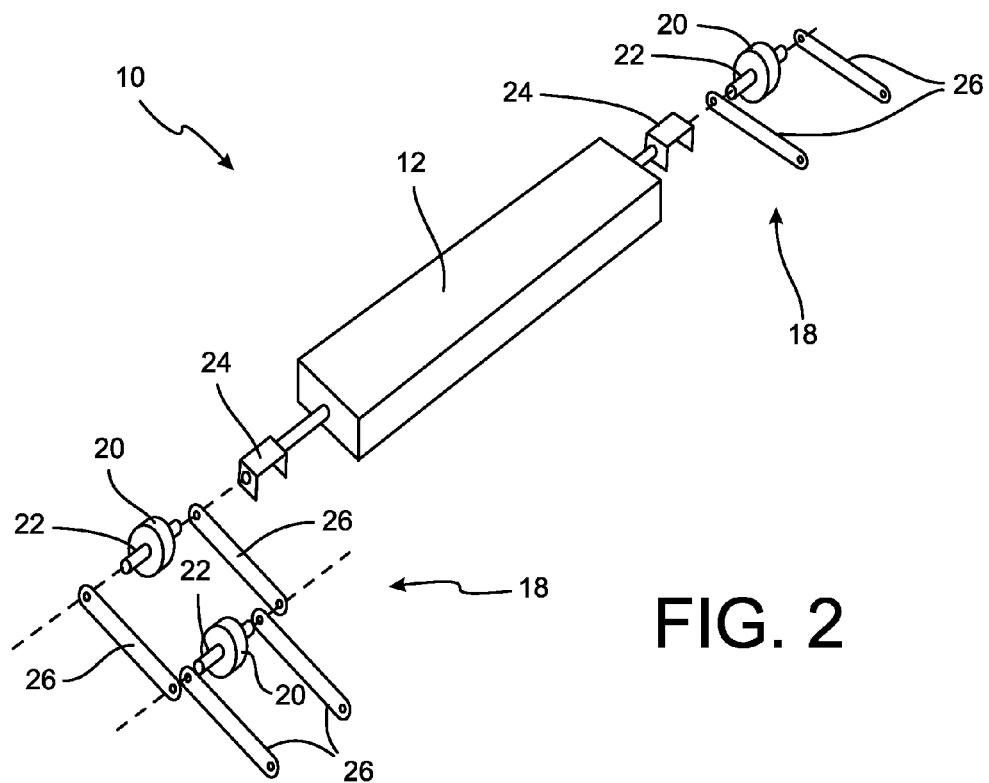
FIG. 2 illustrates a perspective view of one pallet configuration of a conveyor coupled to pallet chain bands.
Figure 3:
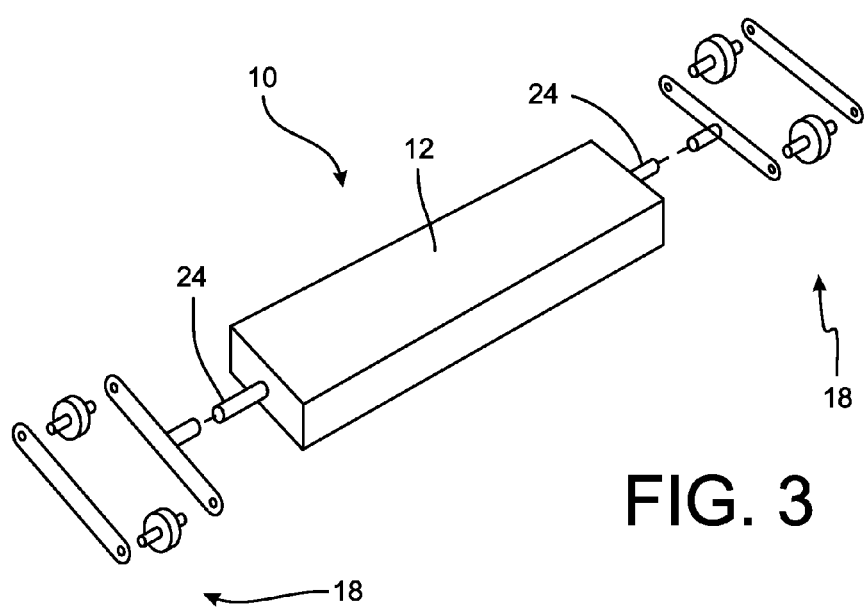
FIG. 3 illustrates a perspective view of another pallet configuration of a conveyor coupled to pallet chain bands.

As shown in FIG. 2, the band of pallets 12 may generally be interconnected through a set of pallet chain bands 18. Furthermore, the pallet chain bands 18 may provide each pallet 12 with a set of pallet chain rollers 20 sized to travel along a drive track (not shown) and configured to facilitate movement of the pallet 12 as it is guided through the conveyor 10. More specifically, each pallet chain roller 20 may be rotatably coupled to an end of the associated pallet 12 using one or more pallet connectors 24, or the like. The pallet chain bands 18 may further include a plurality of pallet chain links 26 that are pivotally coupled to one another as shown in FIG. 2. In other arrangements, the pallet chain links 26 may be coupled directly to the ends of the pallet 12, as shown in FIG. 3, for example. Specifically, a first end of the connector 24 may be rigidly coupled to a center portion of the pallet chain link 26 while a second end of the connector 24 may be pivotally coupled to the end of the pallet 12. In other modifications, the first end of the connector 24 may be pivotally coupled to the pallet chain link 26 while the second end of the connector 24 may be rigidly coupled to the pallet 12. In still further modifications, the connector 24 may be coupled pivotally to each of the pallet 12 and the pallet chain link 26. Furthermore, the conveyor 10 may be configured such that each pallet 12 is axially associated with and coupled to a single set of pallet chain links 26, as shown for example in FIGS. 2 and 3. In alternative embodiments, however, the conveyor 10 may be configured such that each pallet 12 corresponds to multiple adjacent pallet chain links 26, or such that each set of pallet chain links 26 corresponds to multiple adjacent pallets 12. Accordingly, not all pallet chain links 26 may be coupled directly to a pallet 12, and not all pallets 12 may be directly coupled to a pallet chain link 26.

Still referring to FIGS. 2 and 3, the pallets 12 and/or the pallet chain bands 18 of the chain drive device 10 may be provided with a plurality of mechanically engageable extension pins 22. Specifically, the extension pins 22 may be configured to axially extend through the pallet chain rollers 20 and/or through apertures disposed at the ends of the pallet chain links 26, as shown for example in FIG. 2. In still further alternatives, the extension pins 22 may not extend through any of the pallet chain links 26 or pallet chain rollers 20, but rather, extend directly from the ends of the pallets 12. Additionally, the extension pins 22 may or may not be configured to be substantially aligned and/or coaxial with the corresponding pallets 12. In all embodiments, however, the extension pins 22 may be sized and positioned to be engaged by a driving mechanism of the associated chain drive device 10.

Figure 4:
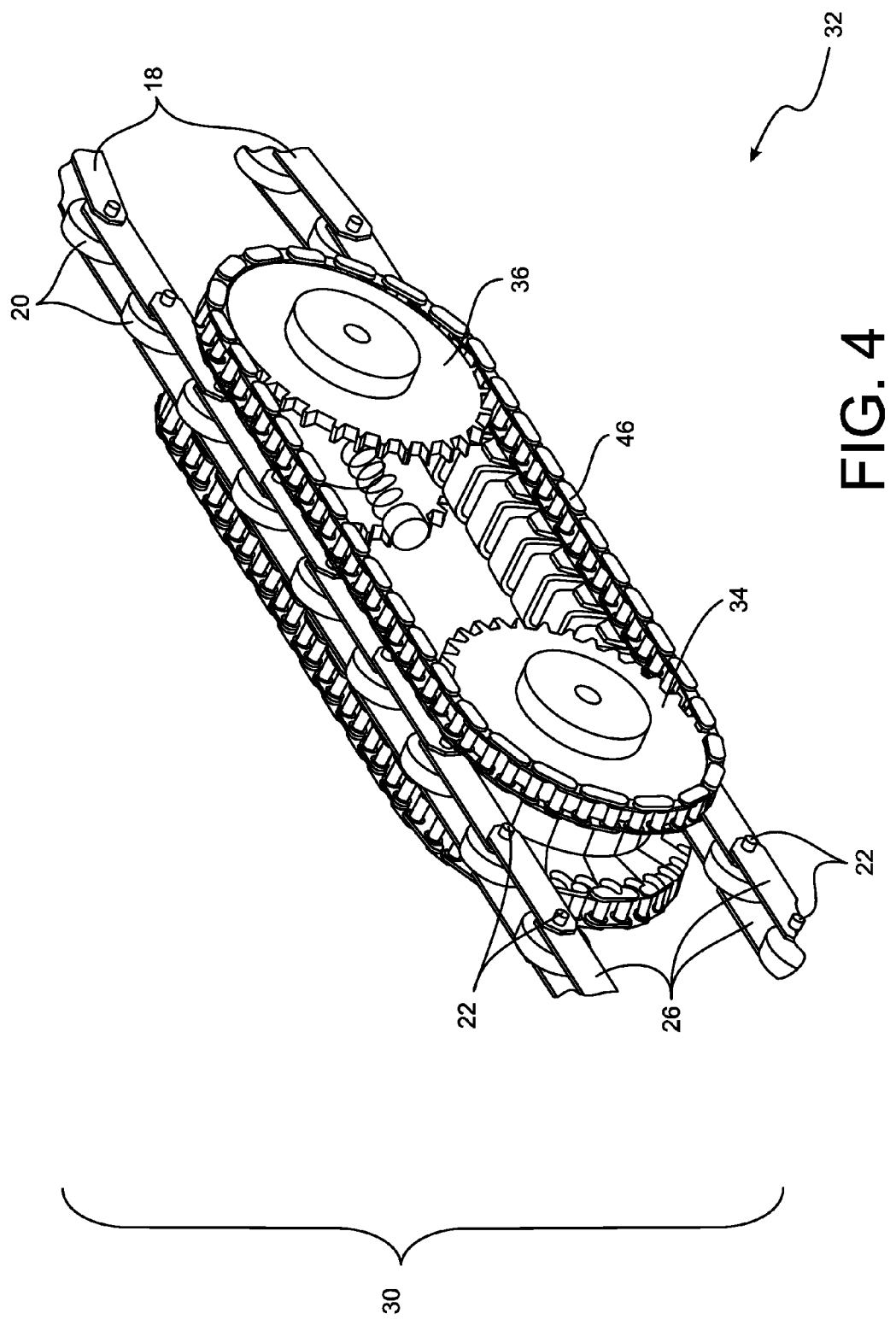
FIG. 4 illustrates a partial perspective view of one drive system constructed in accordance with the teachings of the present disclosure.

Turning to FIG. 4, one exemplary embodiment of a drive system 30, which may be used to drive the pallet chain bands 18 and the associated pallets 12 through the conveyor 10, is provided. As shown, the drive system 30 may provide a drive assembly 32 that is configured to directly engage the extension pins 22 of the pallet chain band 18. The drive assembly 32 of FIG. 4, for example, may generally include a first or a leading sprocket wheel 34, a second or a trailing sprocket wheel 36 and a drive chain band 46 at least partially engaged about the leading and trailing sprocket wheels 34, 36. Any one or more of the sprocket wheels 34, 36 may be driven directly or indirectly by a drive machine (not shown), such as a motor, or any other suitable machine configured to selectively generate and transmit rotational torque to the sprocket wheels 34, 36. Moreover, the drive chain band 46 may be configured such that its shared engagement with the sprocket wheels 34, 36 causes any rotation induced upon the leading sprocket wheel 34, for instance, to induce a corresponding rotation in the trailing sprocket wheel 36 with negligible delay. It will be understood, however, that the second sprocket wheel 36 may alternatively be designated as the leading wheel and driven by the drive machine while the first sprocket wheel 34 may serve as the trailing wheel. Furthermore, while the embodiments disclosed herein may disclose the drive chain band 46 as being implemented using roller chains, it will be understood that the drive chain band 46 may also be implemented using toothed belts, inverted tooth chains, or any other suitable driving mechanism.

Figure 5:
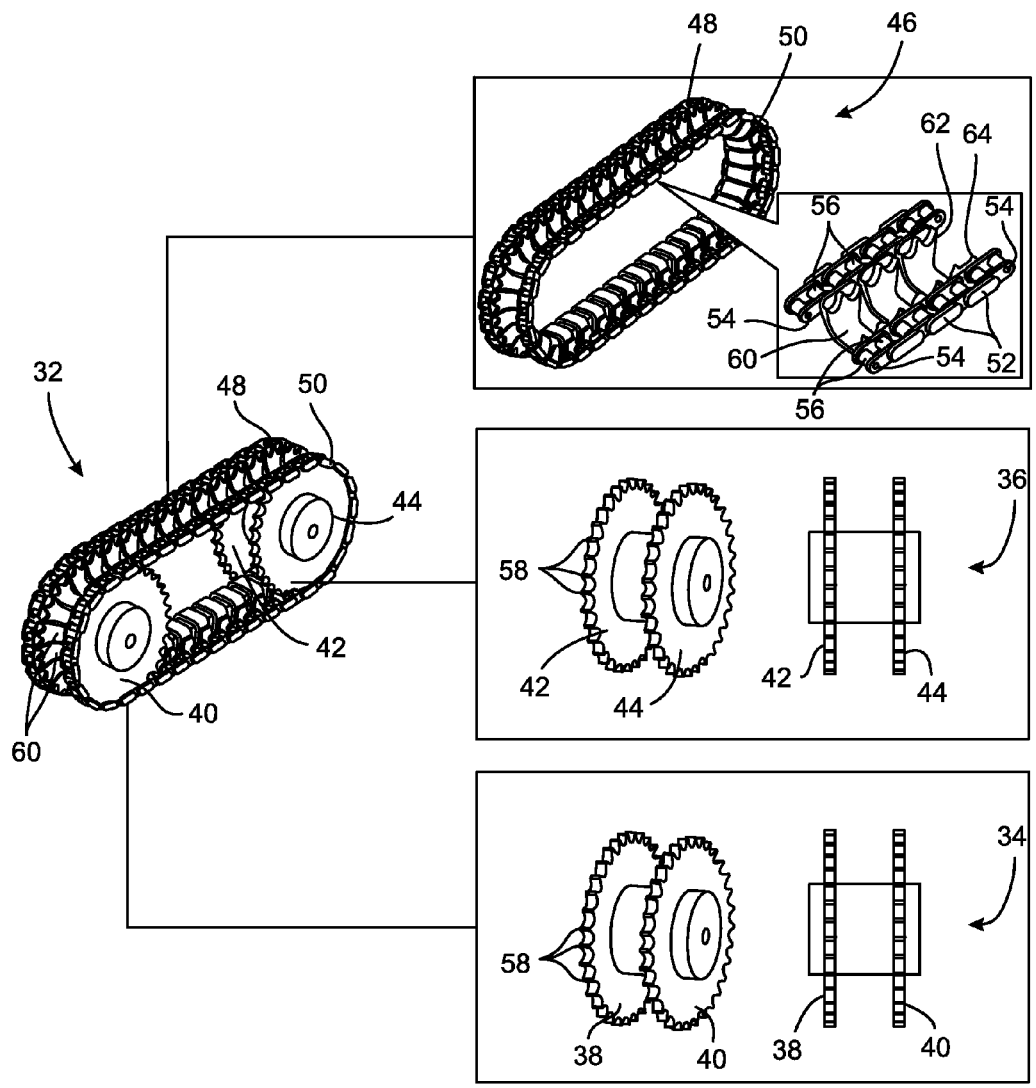
FIG. 5 illustrates perspective views of the drive chain, intermediate connectors and sprocket wheels of the drive system of FIG. 4.

As previously shown in FIG. 4 and as shown in FIG. 5, the drive assembly 32 may include first and second sprocket wheels 34, 36 having a set of sprockets 38, 40, 42, 44, and a drive chain band 46 at least partially engaged thereabout. More specifically, the first or leading sprocket wheel 34 may include a first leading sprocket 38 that is coaxially disposed and distanced relative to a second leading sprocket 40, and the second or trailing sprocket wheel 36 may similarly include a first trailing sprocket 42 that is coaxially disposed and distanced relative to a second trailing sprocket 44. The drive chain band 46 may additionally include a first drive band 48 that is configured to be at least partially engaged by the first leading sprocket 34 and the first trailing sprocket 42, and a second drive band 50 that is configured to be at least partially engaged by the second leading sprocket 40 and the second trailing sprocket 44. Each of the first and second drive bands 48, 50 may include a plurality of drive chain links 52 that are pivotally joined by drive chain link pins 54, which may further include drive chain rollers 56 disposed thereabout. Furthermore, each of the sprockets 38, 40, 42, 44 may include a set of sprocket teeth 58 that are configured to engage with the individual drive chain link pins 54 and the drive chain rollers 56 of the corresponding drive bands 48, 50.

In the drive chain band 46 of FIG. 5, the first and second drive bands 48, 50 may be joined together by a plurality of intermediate connectors 60 configured to engagably receive the extension pins 22 of a pallet chain band 18 associated therewith. More specifically, each intermediate connector 60 may include a first toothed profile 62 that is coupled to a drive chain link 52 of the first drive band 48, and a second toothed profile 64 that is coupled to a drive chain link 52 of the second drive band 50. Thus, the toothed profiles 62, 64 may be configured to engagably receive pins 22 which at least partially extend inter-axially, or between the first and second drive bands 48, 50. Alternatively or additionally, toothed profiles 62, 64 may be similarly disposed at one or more exterior sides of the first and second drive bands 48, 50 so as to engagably receive any pins 22 that may extend outer-axially with respect to the first and second drive bands 48, 50.

Furthermore, the intermediate connectors 60 may be attached to suitable drive mechanisms other than roller chains, such as toothed belts, inverted tooth chains, and the like. In such a way, the intermediate connectors 60 may rigidly couple corresponding pairs of drive chain links 52 of the first and second drive bands 48, 50, and further, enable the first and second drive bands 48, 50 to propagate with rotational alignment with one another and behave as a single drive chain band 46. Although the embodiments shown in FIGS. 4 and 5 may provide a plurality of intermediate connectors 60 which substantially extend the length of the first and second drive bands 48, 50, the drive assembly 32 may alternatively include a fewer number of intermediate connectors 60 distanced according to the pitch of the associated pallet chain band 18.

Figure 6:
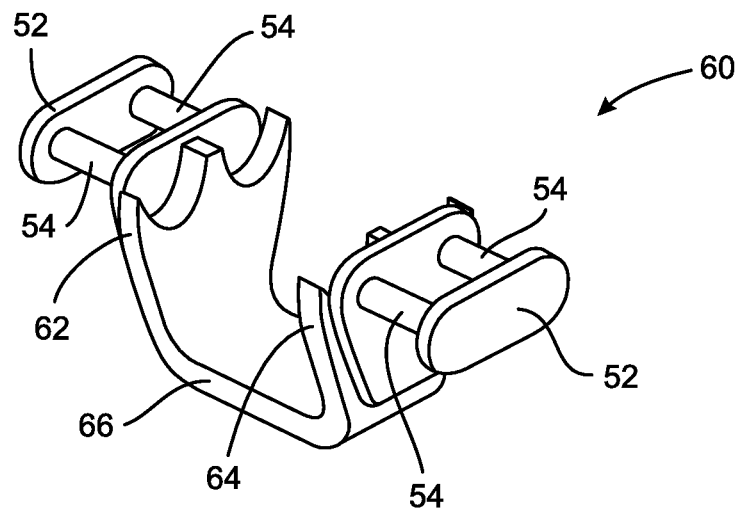
FIG. 6 illustrates a perspective view of one intermediate connector having a duplex-tooth profile that may be used in conjunction with the drive system of FIG. 4.
Figure 7:
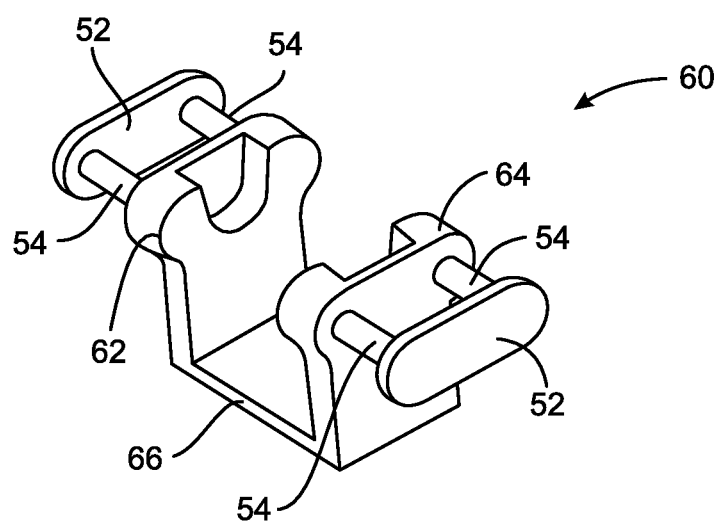
FIG. 7 illustrates a perspective view of one intermediate connector having a single-tooth profile that may be used in conjunction with the drive system of FIG. 4.

Turning to FIGS. 6 and 7, exemplary configurations for the intermediate connectors 60 are provided. For example, each toothed profile 62, 64 of the intermediate connectors 60 may be configured in the form of a duplex-tooth profile, as shown in FIG. 6. Alternatively, each toothed profile 62, 64 of the intermediate connectors 60 may be configured in the form of a single-tooth profile, as shown for example in FIG. 7. In still further alternatives, the intermediate connectors 60 may be sized and configured with a greater number of toothed profiles 62, 64 or with a multi-toothed profile. In all suitable configurations, however, each of the toothed profiles 62, 64 may be sized and configured to sufficiently receive as well as engage at least one extension pin 22 axially extending from the associated pallet chain rollers 20 and/or the associated pallet chain links 26. The intermediate connectors 60 may also be sized and configured to engagably receive at least one extension pin 22 axially extending directly from an end of an associated pallet 12. Furthermore, each intermediate connector 60 may be configured with a recessed midsection 66 disposed between the first toothed profile 62 and the second toothed profile 64. Moreover, the recessed midsection 66 of each intermediate connector 60 may be shaped and sized so as to provide sufficient clearance for the pallet chain rollers 20 and associated pallet chain bands propagating therethrough.

Figure 8:
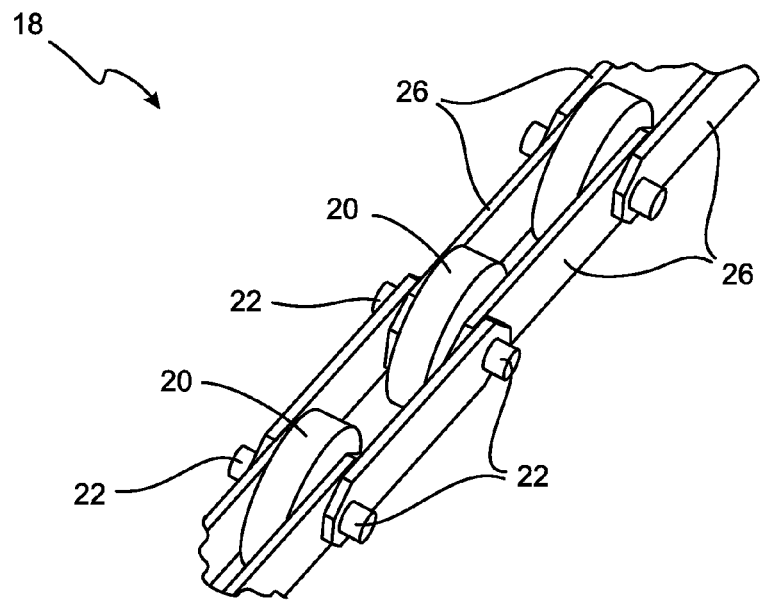
FIG. 8 illustrates a partial perspective view of one pallet chain band having extension pins.

Referring now to FIG. 8, one exemplary embodiment of a pallet chain band 18 that may be used in association with the drive assembly 32 is provided. In the particular pallet chain band 18 disclosed, each pallet chain roller 20 may be rotatable about an extension pin 22 axially extending therethrough. The pallet chain band 18 may further include a plurality of pallet chain links 26 configured to pivotally couple the extension pins 22 of adjacent pallet chain rollers 20 together. The extension pins 22 may be sized to sufficiently extend between the first and second toothed profiles 62, 64 of the intermediate connectors 60, and configured to be adequately engaged by the toothed profiles 62, 64 of the intermediate connectors 60. Alternatively, the extension pins 22 may be provided in the form of removable or permanent attachments which may be screwed, snapped, pressed, or otherwise attached onto existing pallet chain link pins of more conventional pallet chain bands. Furthermore, while the extension pins 22 may be provided to each pallet chain roller 20, as shown in FIG. 8, other arrangements may also be implemented. In particular configurations, for example, where multiple adjacent pallet chain links 26 are associated with a single pallet 12, the extension pins 22 may be partially supplied and provided to only some of the pallet chain rollers 20. Additionally, not all extension pins 22 may be seated within the toothed profiles 62, 64 of the intermediate connectors 60, and conversely, not all toothed profiles 62, 64 of the intermediate connectors 60 may engage an extension pin 22.

Figure 9:
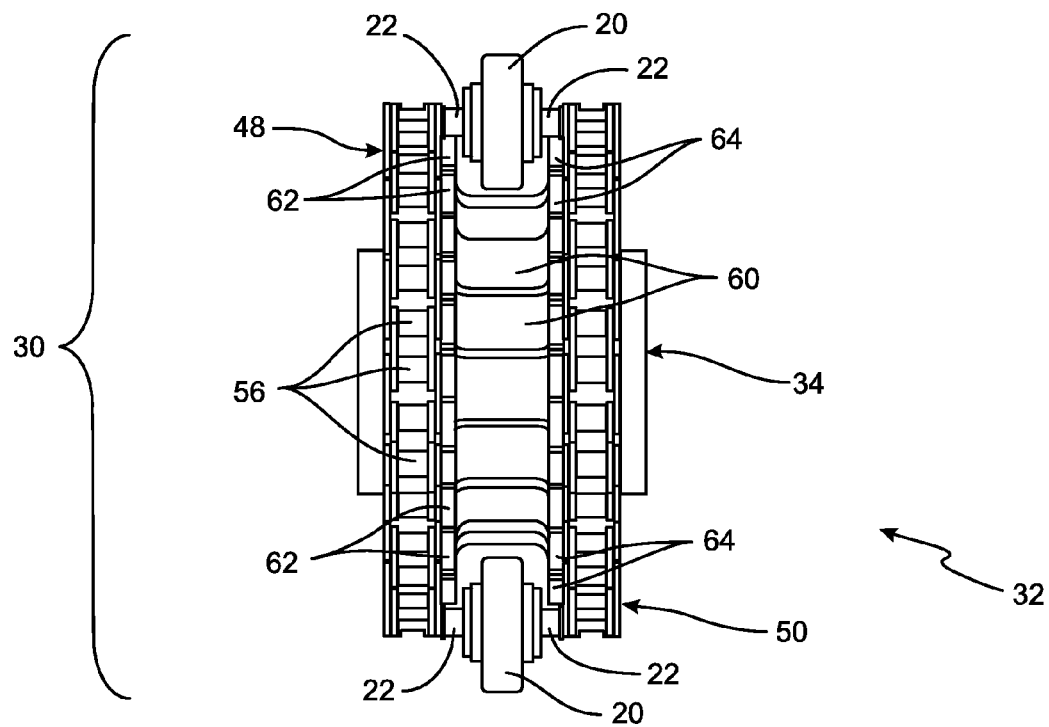
FIG. 9 illustrates a front plan view of one drive assembly engaging the pallet chain band of FIG. 8.
Figure 10:
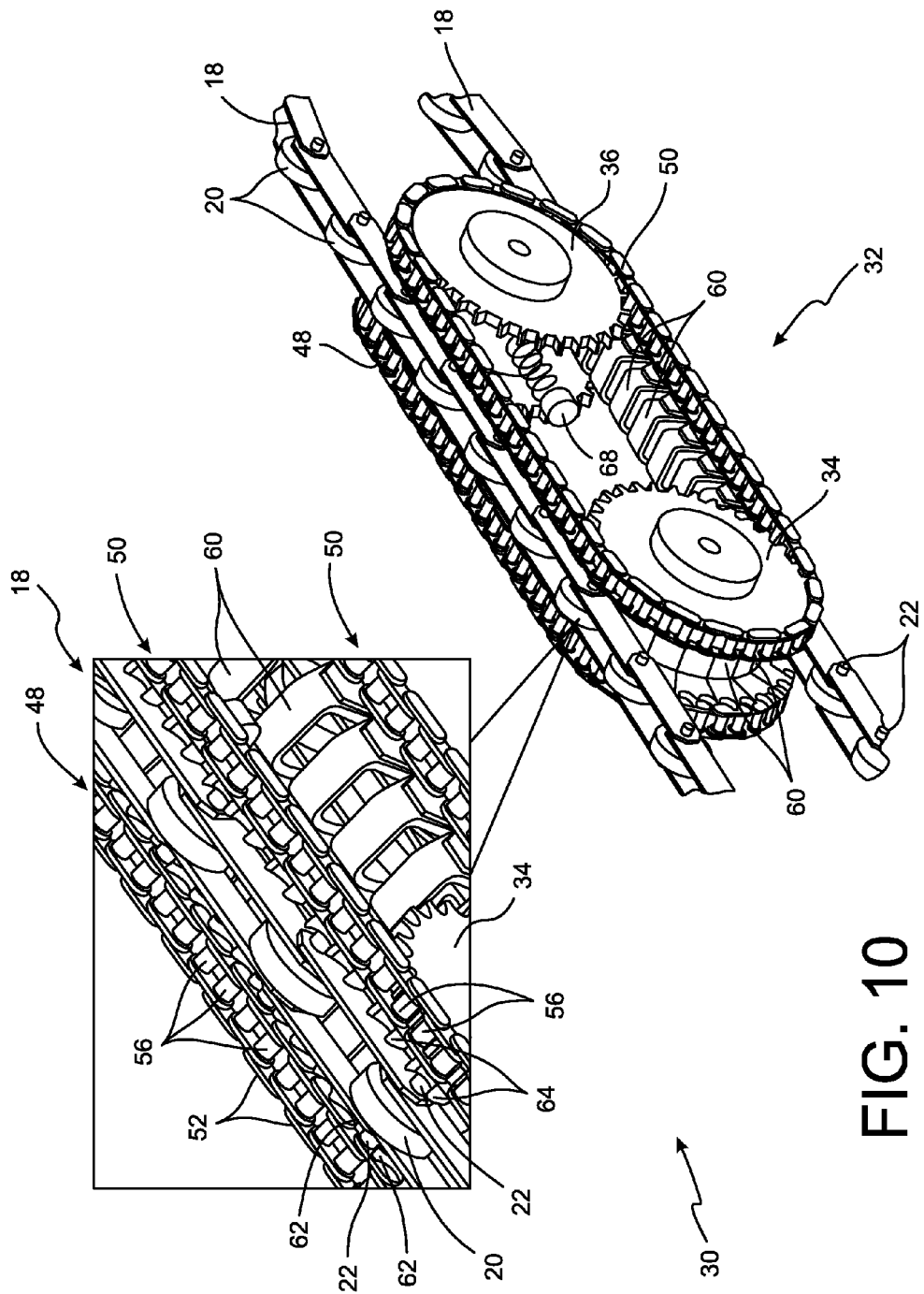
FIG. 10 illustrates a partial perspective view of the drive system of FIG. 9.

As shown by the drive system 30 in FIGS. 9 and 10, the pallet chain band 18 of FIG. 8 may be engaged by the drive assembly 32 in a manner which prevents the pallet chain rollers 20 and the pallet chain links 26 from having any physical contact with the drive assembly 32 during the engagement. More specifically, the intermediate connectors 60 of the drive assembly 32 may be sized and shaped to engage only the extension pins 22 while providing sufficient clearance for each of the passing pallet chain rollers 20 and pallet chain links 26. The drive assembly 32 may further provide two or more sections configured to engage two or more pallet chain bands 18 or two or more runs of a single pallet chain band 18 thereabout. As shown for example in FIGS. 9 and 10, the drive assembly 32 may include an upper section configured to engage an upper run of the pallet chain band 18 corresponding to a carrying portion of the associated chain drive device 10, and a lower section configured to engage a lower run of the pallet chain band 18 corresponding to a return portion of the chain drive device 10. Moreover, the drive assembly 32 may be configured to simultaneously engage multiple pallet chain bands 18, or multiple runs of a single pallet chain band 18, in a manner which more evenly distributes the load thereabout. In alternative configurations, however, the drive assembly 32 may also be employed and sufficiently operable to engage a single run of a pallet chain band 18.

As shown more particularly in FIG. 10, the drive assembly 32 may be configured to engage the pallet chain band 18 such that each engaged pallet chain roller 20 remains substantially aligned with each of the first and second drive bands 48, 50 throughout the engagement. For example, the toothed profiles 62, 64 of each intermediate connector 60 may be specifically positioned such that the center axis of each seated and engaged extension pin 22 is aligned with the drive chain link pins 54 as well as the drive chain rollers 56 of the drive chain band 46. Moreover, the direction of the force exerted on the extension pins 22 by the intermediate connectors 60 may be coincident or substantially aligned with the intended direction of travel so as to minimize or substantially eliminate any bending moments therebetween.

Figure 11:
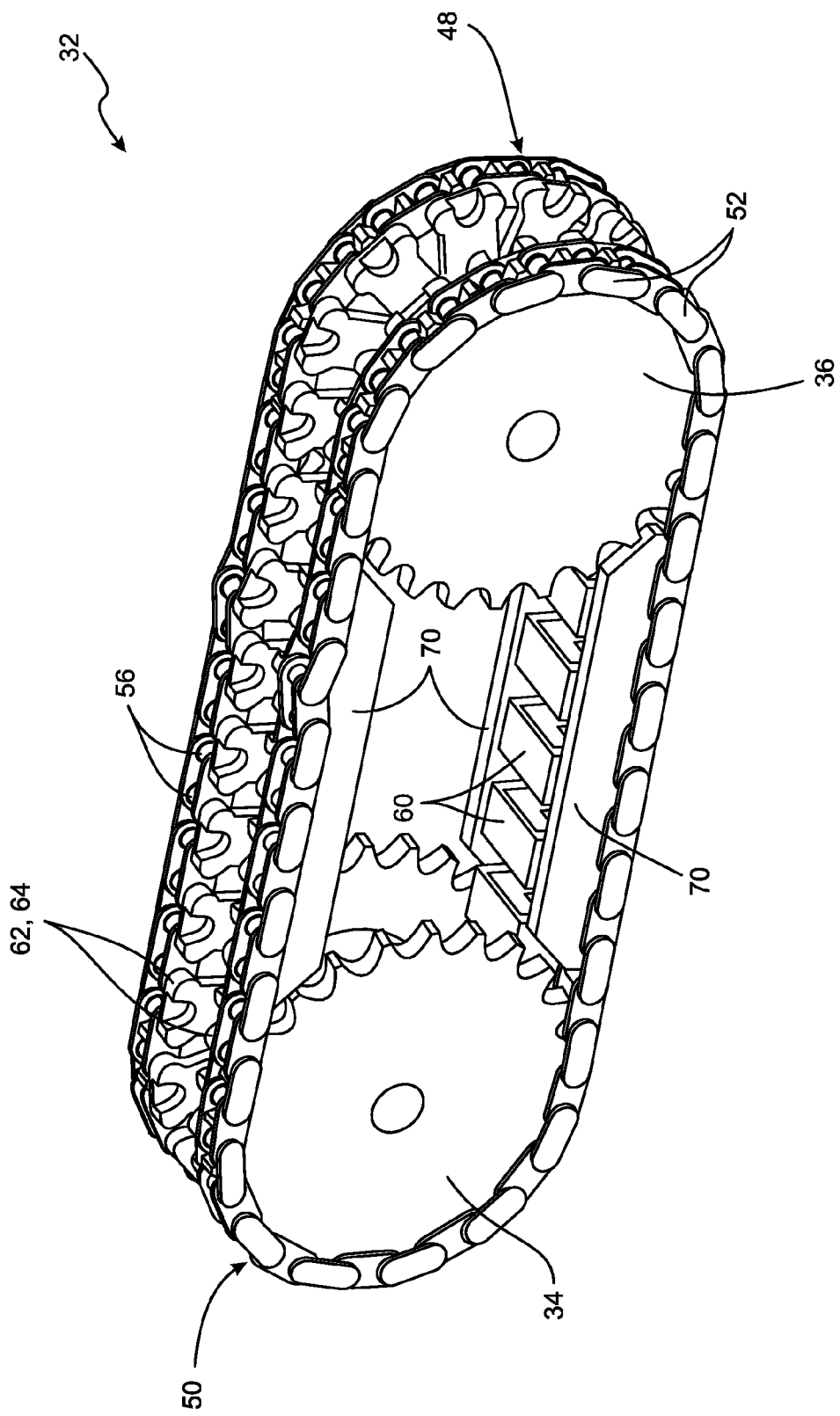
FIG. 11 illustrates a partial perspective view of a drive assembly with drive chain guides.

Additionally or optionally, one or more of the sprocket wheels 34, 36 in each drive system 30 may be provided with a tensioning mechanism 68, as shown in FIG. 10, such as a tension spring, or the like, configured to bias the sprocket wheels 34, 36 in a manner which adequately maintains the tension in the drive chain band 46. In a further modification, the drive system 30 may be provided with drive chain guides 70, as shown for example in FIG. 11. The drive chain guides 70 may substantially extend between the sprocket wheels 34, 36 and help guide each of the first and second drive bands 48, 50 as they travel thereacross. More specifically, each drive chain guide 70 may be disposed in direct alignment with each of the first and second corresponding sprocket wheels 34, 36 as well as in direct alignment with the drive band 48, 50 associated therewith. Each drive chain guide 70 may further be positioned in proximity to the drive chain rollers 56 of a passing drive band 48, 50 so as to reduce any binding or misalignment in the drive band 48, 50, and thus, maintain optimum travel of pallet chain bands 18 being engaged thereacross.

Figure 12:
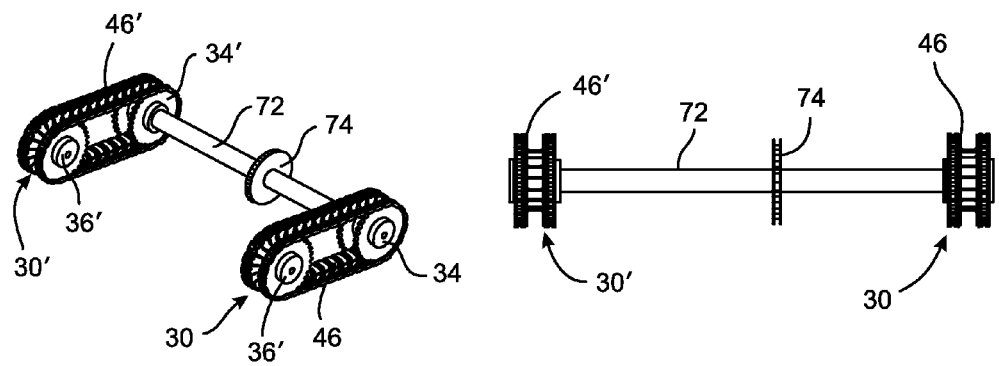
FIG. 12 illustrates partial perspective and front plan views of one possible arrangement of drive systems.
Figure 13:
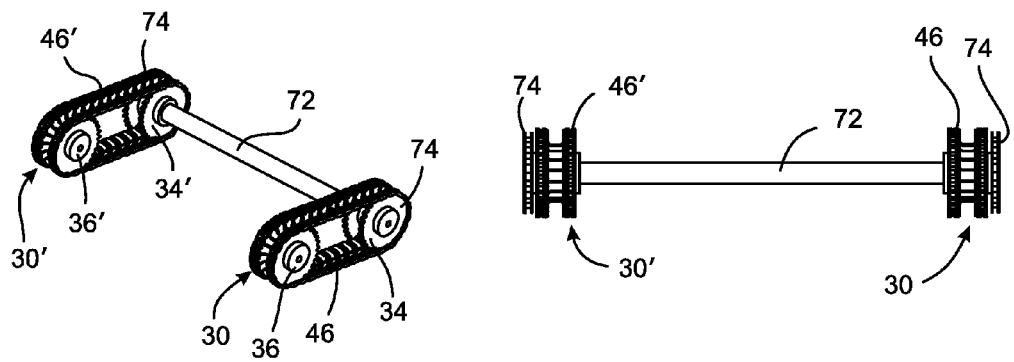
FIG. 13 illustrates partial perspective and front plan views of another possible arrangement of drive systems.
Figure 14:
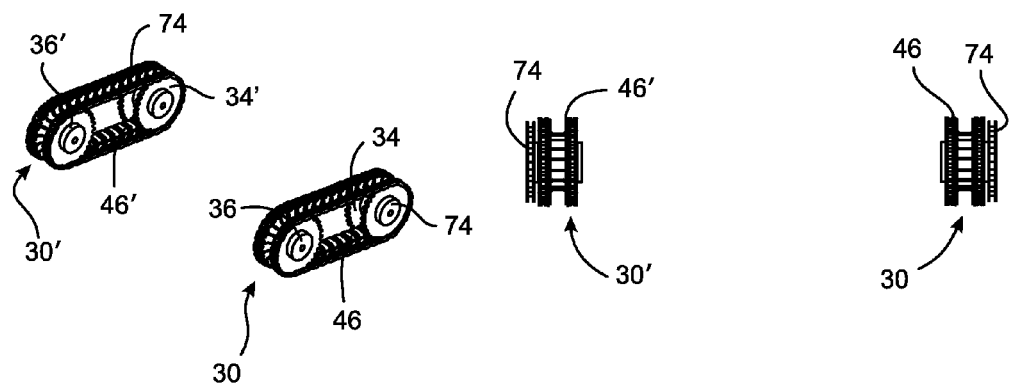
FIG. 14 illustrates partial perspective and front plan views of yet another possible arrangement of drive systems.

Referring now to FIGS. 12-14, the disclosed drive system 30 may be implemented into a chain drive device 10 in any number of ways. For implementation in a moving walkway, as shown in FIG. 12 for example, two drive systems 30, 30' may be opposedly positioned in parallel with one another and coupled together with drive shafts 72, or the like. More specifically, the drive shaft 72 may be rigidly and axially coupled between the leading sprocket wheels 34, 34' such that the corresponding drive chain bands 46, 46' may move with complete rotational alignment with one another. The drive shaft 72 may further include a drive sprocket 74 axially disposed thereon configured to receive a rotational torque from a drive machine (not shown). In other alternative arrangements, as shown in FIG. 13 for example, a drive sprocket 74 may be axially coupled directly to each of the leading sprocket wheels 34, 34' rather than on the drive shaft 72. In still further alternatives, as shown in FIG. 14 for example, individual drive sprockets 74 may be provided to each of the leading sprocket wheels 34, 34' and the drive shaft 72 may be entirely omitted. Additionally, fewer or more drive systems, for example, a configuration of three drive systems, may also be implemented for any suitable variation of the conveyor 10 as needed. Furthermore, it will be understood that synchronization between the various drive systems 30, 30' may be achieved using any one of a plurality of different configurations not necessarily disclosed herein, including the use of electronic controls and/or frequency controls.

INDUSTRIAL APPLICABILITY

Although the embodiments of the present disclosure may be directed to moving walkways, the disclosed drive systems and assemblies may equally or at least similarly be applied to other suitable conveyor systems including passenger conveyors, such as escalators, or the like, as well as non-passenger conveyors, such as industrial conveyors. Furthermore, as demonstrated with moving walkway implementations of the present disclosure, implementing the disclosed drive systems into escalators and other conveyors may introduce similar design and performance benefits.

The drive systems and assemblies of the present disclosure provide a compact linear drive mechanism which propagates a series of pallets that are interconnected by pallet chain bands. The drive chain band is rotatably engaged about two or more sprocket wheels and includes first and second drive bands which are joined together through a series of intermediate connectors. The intermediate connectors provide a set of toothed profiles which are configured to directly engage the extension pins of the pallet chain band. The positioning of the intermediate connectors is such that each engaged extension pin is held in substantial alignment with the drive chain. As such, bending moments on the drive chain bands are significantly reduced if not eliminated while propagating the pallets between conveyor landings. Moreover, as the direction of the force exerted on the extension pins by the intermediate connectors is substantially coincident or aligned with the intended direction of travel of the extension pins and the pallet chain band, the efficiency of energy transfer from the associated drive machine into movement of the pallets is improved.

Furthermore, as the size and/or geometry of the extension pins directly affects only the intermediate connectors and not the drive chain bands, the pitch length of the drive chain bands may be significantly reduced to enable a much more compact and an overall slimmer conveyor. The present disclosure also requires significantly fewer modifications to existing installations and can be implemented relatively easily. Additionally, while the present disclosure may be provided with new pallet chain bands, the disclosed drive assemblies may easily be back-fit with conventional pallet chain bands with minimally modified pallet chain link pins.

While only certain embodiments have been set forth, alternative embodiments and various modifications will be apparent from the above descriptions to those skilled in the art. These and other alternatives are considered equivalents and within the spirit and scope of this disclosure.

What is claimed is:

1. A drive assembly for a chain drive device having pallet chain links, pallet chain rollers and extension pins, comprising:
   a drive chain band having a first drive band and a second drive band;
   a plurality of intermediate connectors disposed between the first and second drive bands, each intermediate connector having a first toothed profile coupled to the first drive band and a second toothed profile coupled to the second drive band, the first and second toothed profiles being configured to receive the extension pins;
   at least one sprocket wheel having a first sprocket and a second sprocket, the first sprocket being configured to engage the first drive band, the second sprocket being configured to engage the second drive band;
   wherein the sprocket wheel includes a leading wheel having a first leading sprocket and a second leading sprocket, and a trailing wheel having a first trailing sprocket and a second trailing sprocket, the first drive band being engaged about the first leading sprocket and the first trailing sprocket, the second drive band being engaged about the second leading sprocket and the second trailing sprocket; and
   at least one drive sprocket coaxially coupled to the leading wheel, the drive sprocket being configured to receive a rotational torque from a drive machine.

2. The drive assembly of claim 1, wherein each intermediate connector includes a recessed midsection configured to provide sufficient clearance for the chain rollers and the chain links traveling therethrough.

3. The drive assembly of claim 1, wherein each toothed profile of the intermediate connectors includes one of a single-tooth profile, a duplex-tooth profile and a multi-tooth profile.

4. The drive assembly of claim 1, wherein at least one toothed profile is disposed at an exterior side of the drive bands and configured to engagably receive any pins outer-axially positioned relative to the drive bands.

5. The drive assembly of claim 1, wherein the intermediate connectors are coupled to the chain links by one or more of screwing, snapping and pressing thereon.

6. The drive assembly of claim 1, wherein the drive bands are comprised of one of roller chains, toothed belts and inverted tooth chains.

7. The drive assembly of claim 1, wherein the drive bands and the intermediate connectors form two or more sections that are simultaneously engaged.

8. The drive assembly of claim 1, further comprising pallet connectors directly coupled to the pallet chain links.

9. The drive assembly of claim 1, wherein the extension pins are axially coupled directly to the pallets.

10. The drive assembly of claim 1, wherein the first and second drive bands are of equal lengths and have an equal number of drive chain the first and second drive bands being oriented such that each drive chain link of the first drive band is in direct rotational alignment with the corresponding drive chain link of the second drive band, the first and second sprockets being oriented such that each sprocket tooth of the first sprocket is in direct rotational alignment with a corresponding sprocket tooth of the second sprocket.

11. The drive assembly of claim 10, wherein adjacent intermediate connectors are distanced according to the pitch of an associated pallet chain band and not all extension pins are seated within an intermediate connector.

12. The drive assembly of claim 10, wherein not all toothed profiles of the intermediate connectors engage an extension pin.

13. The drive assembly of claim 10, wherein adjacent drive chain links in each of the first and second drive bands are pivotally joined by drive chain link pins having drive chain rollers coaxially disposed thereabout, the intermediate connectors being configured to engage the extension pins such that the center axis of each engaged extension pin remains substantially aligned with the drive chain link pins and the drive chain rollers, and the direction of force applied onto the extension pins is in substantial alignment with the direction of travel of the drive chain link pins.

14. The drive assembly of claim 1, wherein at least one toothed profile is disposed at an exterior side of the first and second drive bands and configured to engagably receive any pins outer-axially positioned relative to the first and second drive bands.

15. The drive assembly of claim 1, further comprising drive chain guides disposed between the leading and trailing sprocket wheels and configured to guide travel of each of the first and second drive bands thereacross, each drive chain guide being disposed in substantial alignment with each of the first and second corresponding sprocket wheels and the first and second corresponding drive bands associated therewith.

16. The drive assembly of claim 1, wherein at least one of the leading and trailing wheels is biased by a tensioning mechanism in a direction configured to maintain tension in the drive chain band between the leading and trailing wheels.

17. The drive assembly of claim 1 being configured for a passenger conveyor.

18. The drive assembly of claim 1 forming two or more sections which simultaneously engage two or more runs of an associated pallet chain band.

19. A drive assembly for a chain drive device having pallet chain links, pallet chain rollers and extension pins, comprising:
   a drive chain band having a first drive band and a second drive band;
   a plurality of intermediate connectors disposed between the first and second drive bands, each intermediate connector having a first toothed profile coupled to the first drive band and a second toothed profile coupled to the second drive band, the first and second toothed profiles being configured to receive the extension pins;
   at least one sprocket wheel having a first sprocket and a second sprocket, the first sprocket being configured to engage the first drive band, the second sprocket being configured to engage the second drive band; and
   at least one drive sprocket coaxially coupled to the leading wheel, the drive sprocket being configured to receive a rotational torque from a drive machine;
   wherein the sprocket wheel includes a leading wheel having a first leading sprocket and a second leading sprocket, and a trailing wheel having a first trailing sprocket and a second trailing sprocket, the first drive band being engaged about the first leading sprocket and the first trailing sprocket, the second drive band being engaged about the second leading sprocket and the second trailing sprocket;
   wherein a drive shaft is axially disposed between the leading wheel and a second leading wheel of a second drive system, the drive sprocket being configured to receive a rotational torque from a drive machine in the drive shaft.

* * * * *